United States Patent [19]

Lapeyre

[11] Patent Number: 4,547,860

[45] Date of Patent: Oct. 15, 1985

[54] COMPUTER KEYBOARDS WITH FEW KEYS DESIGNATING HUNDREDS OF FUNCTIONS

[75] Inventor: James M. Lapeyre, New Orleans, La.

[73] Assignee: The Laitram Corporation, New Orleand, La.

[21] Appl. No.: 459,998

[22] Filed: Jan. 21, 1983

[51] Int. Cl.⁴ .............................................. G06F 3/02
[52] U.S. Cl. .................................... 364/709; 364/900
[58] Field of Search ...................... 364/709, 200, 900; 340/365 S

[56] References Cited

U.S. PATENT DOCUMENTS

| | | | |
|---|---|---|---|
| 3,892,958 | 7/1975 | Tung | 364/709 |
| 3,967,273 | 6/1976 | Knowlton | 340/365 S |
| 4,120,040 | 10/1978 | Aihara | 364/709 |
| 4,202,038 | 5/1980 | Petersson | 364/709 |
| 4,272,826 | 6/1981 | Deutsch | 364/709 |
| 4,279,022 | 7/1981 | Abe | 364/709 |
| 4,302,816 | 11/1981 | Yamamoto | 364/709 |
| 4,344,069 | 8/1982 | Prame | 340/365 S |

FOREIGN PATENT DOCUMENTS 0011307 5/1980 European Pat. Off. .
1417849 12/1975 United Kingdom .

*Primary Examiner*—David H. Malzahn
*Attorney, Agent, or Firm*—Laurence R. Brown

[57] ABSTRACT

A computer keyboard system provides for fast entry of all numeric data, yet with only a small number of keys, such as the minimum number of twelve, is able to make hundreds of computer functions available for access from the keyboard. Typically a sixteen key keyboard will make available 266 different functions from a modern computer chip, surprisingly without sacrifice of more complex programming procedures and with significant advantage in providing finger room for error free operation of pocket-size computers, for example. A charted catalog of functions and corresponding keystroke selections is graphically displayed adjacent the keyboard keys so that reference to an instruction manual is minimized. Also by appropriate abbreviated notation a more diverse selection of functions is available to the keyboard as designated functions. This simplification of keyboards to be able to provide access to the many built-in programs, subroutines and functions available on modern day computer chips is made feasible by operating a live keyboard in a data input mode and shifting the mode by an execute key to a function selection mode requiring a sequence of two (or more) keystrokes. Thereby for X keys on a keyboard $X^n$ functions become accessible where n is the number of keystrokes in the function selection sequence.

22 Claims, 5 Drawing Figures

COMPUTER KEYBOARDS WITH FEW KEYS DESIGNATING HUNDREDS OF FUNCTIONS

TECHNICAL FIELD

This invention relates to computer keyboards and more particularly it relates to providing access to more computer functions with fewer keys.

BACKGROUND ART

The trend in keyboards is to add keys to match the need for access to more of the computer functions made available with modern computer chips. Hand held computers regularly employ 40 keys and desk top computers often have well over 100 as standard. Even so, keyboards have not kept pace with the proliferation of computer chip functions available in the art, literally numbering in thousands for a single standard chip. Thus as computers become more powerful and compact, keyboards are becoming more bulky and confusing. This trend, in ergonomic terms, is hardly to be considered a good one, since in order to have computers used with ease by more people it is imperative that the user/computer interface be simplified both in structure and in logic.

Keyboard U.S. Pat. No. 3,892,958—July 1, 1975 to C. C. Tung is exemplary of the trend by some manufacturers in the keyboards they offer. The objective is to reduce the number of computer keyboard keys, yet 35 keys are still used. Prefix keys (gold—f and blue—g) are added for use in activating the keyboard in alternative computer selection modes to permit the keyboard to select three different functions per key. This extends the range of a 39 key keyboard available in a Hewlett Packard Model 15C computer, for example, to make accessible more of the computer chip built-in operating functions and program modes, namely 96, but at a cost of additional keys. Still 96 functions are undoubtedly far less than the several hundred available on computer chips in the present state of the art. Thus, access to full capacities of the chips is not feasible with the prior art keyboards, and a relatively large number of keys is still required to significantly extend the keyboard capacity to select more functions available on the chip.

Furthermore, with the 39 keys (or more as required to process more powerful chips) in a hand held pocket-sized computer, the keys have to be placed so close together that it is difficult to make choices manually without fingering a wrong key. Also a sequence of reasoned selections must be made on prior art keyboards that interrupts the mental process and thereby introduces many opportunities for potential error into the key selection process.

This potential for error in manual selection of computer functions is even more pronounced whenever there are routines performed which are not indicated visibly on the keyboard in easy to identify and follow notation. Prior art keyboards have not resolved the problem of how to indicate two or more successive keystrokes necessary to complete some of the selectable functions or programs except for the aforesaid example which color codes a prefix key with a code abbreviation of the functions made accessible thereby. If complex key stroke sequences for various functions need be memorized or intermediate reference made to an instruction manual, the propensity for error is increased by the further interposition of unrelated thought processes. Thus, it has not been possible to provide access directly adjacent the keyboard keys of the necessary information for using a computer to perform several functions in many modes of operation. This is particularly true for pocket-sized computers where keyboard space is necessarily limited. Even desk-top computers which have to be programmed by mathematics and engineering oriented persons who are not expert typists are difficult for some users as they must "hunt and peck" among the more than one hundred keys which are usual on such keyboards.

The keyboard patent heretofore mentioned does provide a limited amount of flexibility to the use of keys on the keyboard as identified by visible keyboard legends. Thus the keyboard is usable in three different modes for function selection. To activate the two additional modes a manual selection of a color coded key is required such as gold (f) and blue (g) to correspond to color coded legends on the keyboard panel facing or key. While this substantially triples the number of functions available to the keyboard it requires more not fewer keys, and it requires a search of the desired function on one of three color coded legends over the keyboard face, a physical move to another part of the keyboard for the prefix keystroke for that color code and a return to the selected key for function selection. Clearly, the chances for error are great, and time taken in selection and operation is long. Furthermore, there is no way taught in the prior art for using substantially all the functions available from the computer chip with a simple keyboard having a few keys.

Present day portable computers, which already have phenomenal computing capability, can have their capability expanded still further by the use of special purpose plug-in chips which are pre-programmed to solve problems peculiar to specialized disciplines such as navigation, mechanical engineering, electrical engineering, statistics, etc.

When these "modules" are plugged in to the host computer the total computing power of even hand-held instruments is increased substantially.

An already serious ergonomics problem is compounded, however, since the user is now required to remember the increased repertoire of his instrument or refer to the instruction book and then manipulate the 35 or so keys in a manner which is not self-evident from the appearance of the keyboard. Specially printed keyboard overlay cards are of some help, but being passive they do not alter the functioning of the keys which retain the identical functions whether or not the overlay card is in place.

DISCLOSURE OF THE INVENTION

This invention provides a computer keyboard system with a set of a few (X) keyboard keys such as 12 for entering data and communicating with the computer chips to execute more than one hundred functions. Thus, surprisingly a few keys can execute a large number of functions, and yet the operating steps are not complex. Furthermore, there is a distinct advantage in spacing keys a greater distance apart, not only to reduce errors in fingering an unwanted key, but also to provide graphics room for charting the plurality of functions selectable by each of the keys. A keyboard having few keys is advantageous also because the keys may be placed within reach of the fingers of one hand without large hand movements thereby making possible use of a touch system in fingering the keys. I estimate that if a computer could be programmed using only 12 to 16 keys by the touch system then programming time could be cut by a factor of 3.

Ten decimal digit keys (0 to 9), a decimal point key and a function execute key (XQ) comprise a minimal number of keys (12) that can be used while retaining the important function of entering decimal digits with a single keystroke to form multi-digit numerical words by successive sequential keystrokes. Preferably, but not necessarily, the computer operates in Reverse Polish Notation (RPN) logic in which a simple arithmetic function proceeds in different sequence than the arithmetic convention. Thus, the arithmetic problem y+z=a proceeds in response to the successive keystrokes y, enter, z, plus, to display the answer a.

The keyboard versatility is attained by employing a computer operating mode which changes from a first data entry mode with a live keyboard permitting single stroke entry of the decimal digits, and other key designated functions (decimal, and $+$, $-$, $\div$, $\times$, etc. if desired). Data may be entered by sequentially selecting digits of a first word (operand y) and signalling entry by shift into a different (y) register, preferably by using a second stroke of a decimal point key in the word (normally not used and inactive) as an entry signal. This saves a separate entry key. The second word (g) is then entered. In some cases, $\sqrt{y}$ for example, only one word (y) need be entered. After the single or double data word is entered, the execute button (XQ) is actuated to initiate a second computer mode activating the keyboard keys to execute a different set of designated functions in response to the sequential selection of n successive keystrokes, preferably two. However, the greater n is, the more functions can be connected for keyboard accessibility. Accordingly, in the second mode $(12)^n$ key actuated selections are made available in addition to 12 in the first mode. Thus, a very large number of functions in a modern computer chip may be made accessible. With a three stroke sequence in the second mode and 12 keys therefore 1728 functions are available for keyboard access in the second mode.

The invention furthermore provides a graphic display panel charting adjacent the keys on the front panel of the keyboard a chart identifying the accessible functions by appropriate abbreviated legends together with the keystroke sequence for selecting each function. Thus, it seldom becomes necessary to consult an instruction manual, which can be larger than the computer, provided the basic operating sequences are understood.

THE PREFERRED EMBODIMENTS

Figure 1:
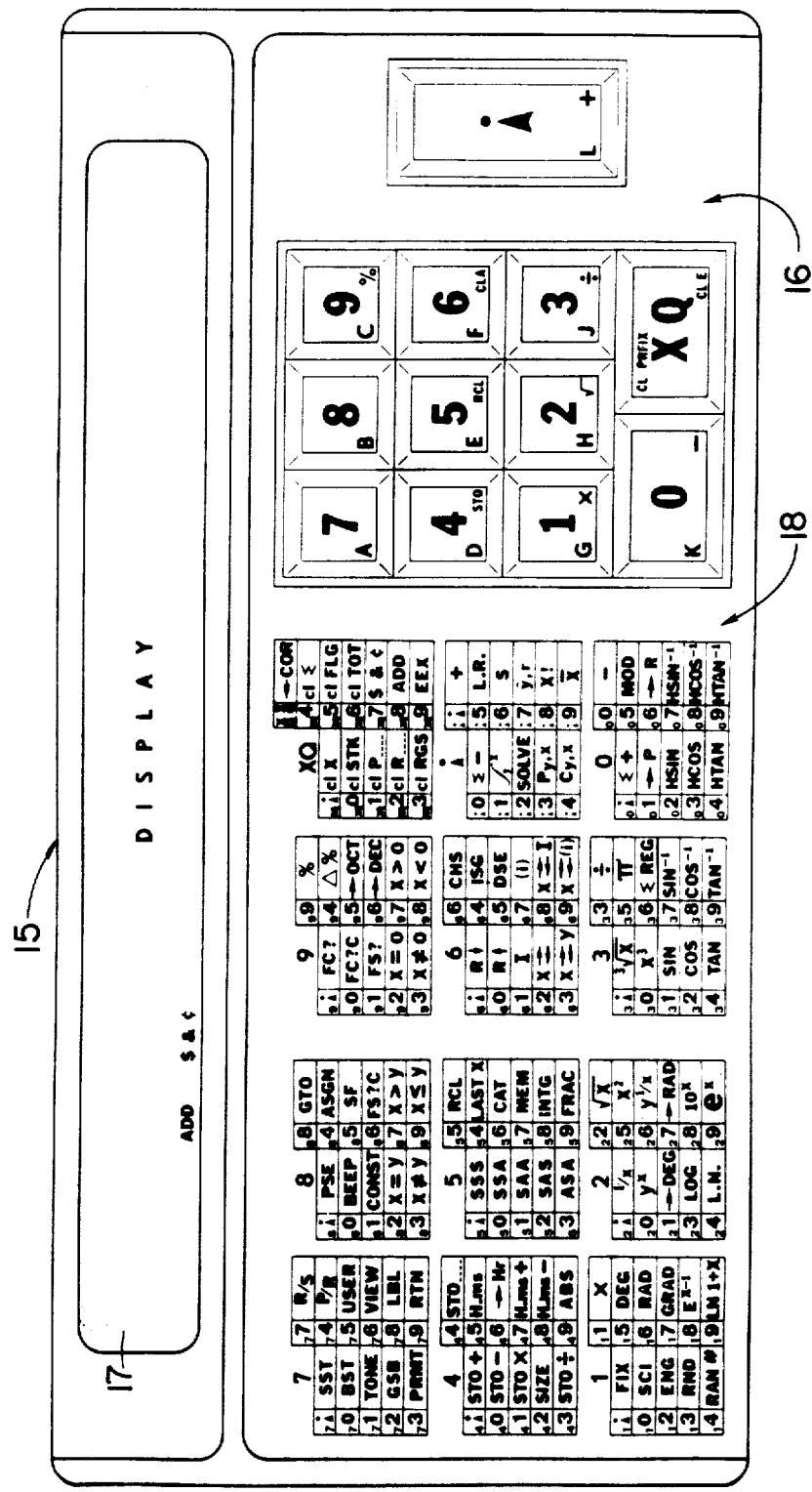
FIG. 1 is a front panel sketch of a portable twelve key computer keyboard, temporary electronic display screen, and graphic display chart of selected functions and modes accessible by this invention.

The computer keyboard system of FIG. 1 afforded by this invention is incorporated in a portable computer 15, with twelve keyboard keys 16 bunched on the right hand side of the keyboard front panel. The temporary electronic display screen 17 is disposed along the length of the casing, thereby providing the space in the left hand side of the keyboard panel for disposing a graphic display panel chart 18 identifying the various computer functions, sub-routines and modes, etc. accessible to keyboard selection. Also, the chart indicates the necessary keyboard strokes for each function.

In accordance with this invention therefore, the twelve keys 16 serve to select any of the 133 listed functions plus the original twelve functions shown in bold face legend on the keyboard keys plus miscellaneous further functions and other modes for a total capacity of about 150 functions selectable with only 12 keys. Note that the decimal (.) key is used for dual purposes in the first mode, thereby serving to reduce the number of keys necessary on the keyboard to make possible complete and convenient access to the various ones of the functions available.

There are other optional differences within the framework of this invention. For example if the XQ key is used as a Clear key to void an incomplete selection of a function then the total functions accessible by the keyboard is: $(X \times (X-1)^{n-1})+1$. If the XQ key is not desired to be used as a Clear key as stated above, then the total number of functions accessible by a keyboard is $X^n$.

Where:
 X = Total keyboard keys.
 n = Number of keystrokes in sequence required for function selection.

The following charts will serve to show that very large numbers of functions can be addressed with few keys depending upon the number (n) in the keystroke sequence used:

| $(X \times (X-1)^{n-1}) + 1$ (Preferred) Using XQ as a clear for incomplete function selection FUNCTIONS ACCESSIBLE | | | $X^n$ Not using XQ as a clear for incomplete function selection FUNCTIONS ACCESSIBLE | | |
|---|---|---|---|---|---|
| X | n | | X | n | |
| 12 | 1* | 13 | 12 | 1 | 12 |
| 12 | 2 | 133 | 12 | 2 | 144 |
| 12 | 3 | 1,453 | 12 | 3 | 1,728 |
| 12 | 4 | 15,973 | 12 | 4 | 20,736 |
| 16 | 1 | 17 | 16 | 1 | 16 |
| 16 | 2 | 241 | 16 | 2 | 256 |
| 16 | 3 | 3,601 | 16 | 3 | 4,096 |
| 16 | 4 | 54,001 | 16 | 4 | 65,536 |

*in ADD MODE - where provided

The keyboard is live in a first data entry mode for entering decimal digits 0 to 9 and the decimal point and also to shift the computer mode for a data processing or function selection mode with a single keystroke. The execute key (XQ) on its second successive stroke serves a clear function to correct (←COR) and clear the last entry. The decimal key (.) when actuated the second time within a numeric word serves as an enter key to enter the word into a y register as an operand. This is possible because a second decimal point is never found in a numeric word.

These features aid the use of this minimum number of twelve keys on the keyboard without sacrificing the rapid data entry characteristic using a single keystroke to enter a decimal digit. Furthermore, keyboard accessibility is provided to more computer functions per key than before believed feasible. To achieve this, a second mode of operation is established by the execute key (XQ), namely the function selection mode, wherein the live keyboard used for data entry is converted to require two keystrokes per function selection, thereby producing 144 function selection possibilities.

It will be noted that if the computer is put into the ADD mode by executing XQ8 then the stroking of the decimal point a second time directly adds the keyed in number to the previous total shown in the display. In the ADD mode then, the functions shown in the lower right hand corner of the keys may be accessed by a single stroke of the appropriate key following a stroke of the XQ key.

| Example: Go to the ADD MODE: | | | |
|---|---|---|---|
| XQ | XQ | 8 | ADD appears in the display. |

Then to add numbers 15.75+16.98+20.32 the keystrokes are as follows assuming the display has been cleared

| XQ | XQ | 6 | . | | | |
|---|---|---|---|---|---|---|
| | | | | | | DISPLAY: 000 On the second stroke in this mode the decimal key becomes a + key, in the ADD MODE only. |
| | 1 | 5 | . | 7 | 5 | '+ DISPLAY: 15.75 |
| | 1 | 6 | . | 9 | 8 | '+ DISPLAY: 32.73 |
| | 2 | 0 | . | 3 | 2 | '+ DISPLAY: 53.05 |

Now if 3.58 is to be subtracted from the displayed total simply stroke:

| 3 | . | 5 | 8 | XQ | 0— | DISPLAY: 49.47 |
|---|---|---|---|---|---|---|

If while in the ADD mode 15% of the displayed number is required simply stroke:

| 1 | 5 | XQ | 9 | DISPLAY: 7.4205 |
|---|---|---|---|---|

In addition to the example shown there is another mode for use primarily by the touch system 12-key keyboard and that mode is the $/¢ mode XQ XQ 7 In the $/¢ mode the computer "knows" where the decimal point has to be and therefore the first stroking of the decimal point key automatically adds the number and points off two places. For example, in the ADD mode and in the $/¢ mode, to add a column of figures the operator need only enter the pennies, i.e. 2539 ($25.39) and on the first stroke of the decimal point key the number is added, this saves all stroking of the decimal key, as a decimal point, which has now become a plus key.

Frequently used functions are located for quick and convenient reference and access by two successive strokes of the same key in the function selection mode, as indicated in the upper right hand cell of each cell block in chart 18. The bold arrow on the decimal key designates the enter function for its second stroke in the keyboard entry mode. The alphabetic characters on the lower left of the keys are available for designating programs in the program mode when labelling (LBL) is required and thus are accessible by three keystrokes. Note that eleven functions are selectable that require a first 7 key stroke in the upper left box of chart 18 adjacent 7 in eleven different cells. (In this embodiment therefore the execute key (XQ) is not used as a second keystroke selection, and only 132 function selections are illustrated in the various cell blocks as designated or accessible functions.) Thus, the second keystroke 8 will initiate the label (LBL) mode for selection of the alphabetic character to produce a set of 11 selections with a three successive keystroke sequence. Thus to provide an "A" label then, (when in the program mode) the key sequence 7-8-7 (the last 7 being the A since in the program mode the XQ is presupposed and therefore automatic).

The graphic display chart 18 therefore identifies the available functions together with the keystroke sequence required to select any particular one of the functions, and the keyboard 16 having few keys can select hundreds of such functions.

Figure 2:
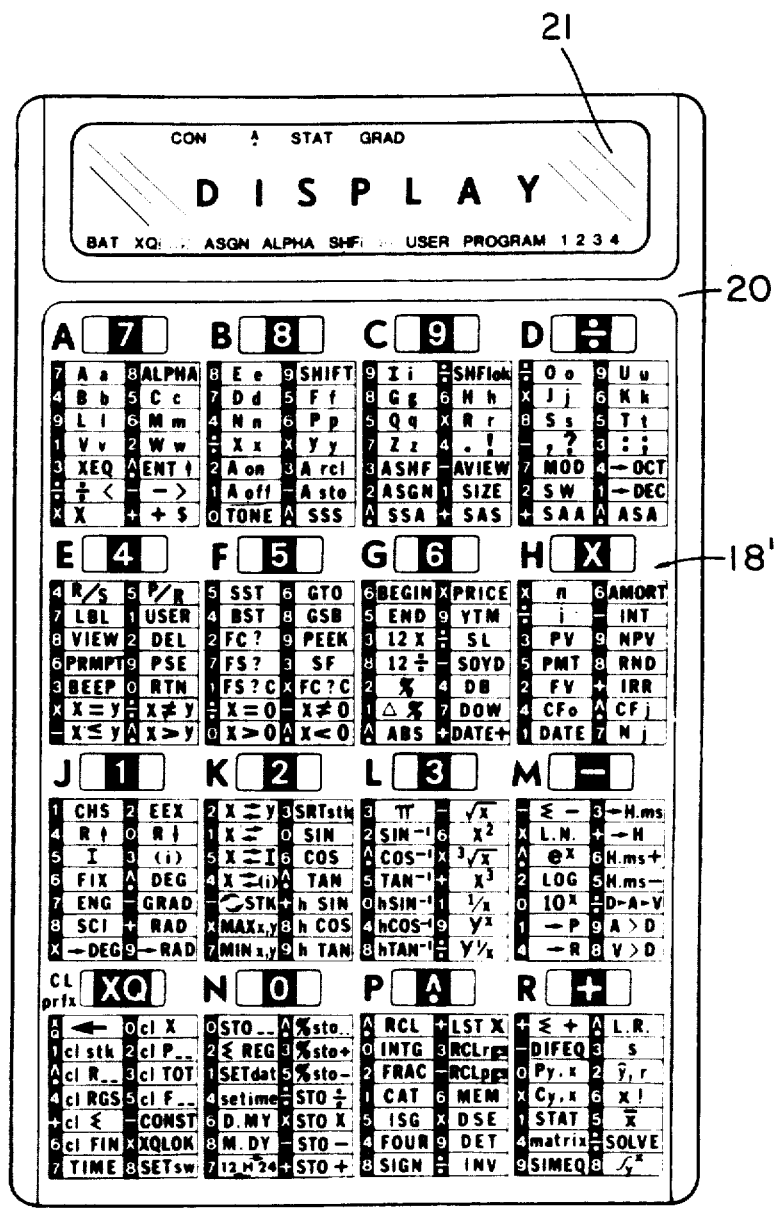
FIGS. 2 and 3 are further computer keyboard panel embodiments of a pocket-sized computer having a different display screen aspect ratio and a sixteen key keyboard.

The hand-held computer 20, of FIG. 2, operates in a similar manner with sixteen keys so that the commonly used calculating functions ÷, ×, —, + may be executed directly in the data entry mode without an intermediate "execute" keystroke. In this embodiment 224 functions are listed in the cells with fourteen functions accessible for each keyboard key. A maximum of sixteen functions can be used for each key with a sixteen key keyboard. This embodiment has the additional advantage that this invention provides of using few enough keys to be separated by a relatively large space on the keyboard for ready manual selection without interference with adjacent keys formerly required because many keys were necessary to process a large number of functions. Also this provides a format where each set of functions (fourteen) to be actuated by each key is located adjacent that particular key. Thus, key selection is made easier and less prone to mistake in the manual process.

Note that this keyboard, among other features, provides for alphabetic operation (alpha 7-8) in data processing with both upper and lower case (shift 8-9). The vowels, A for example, are made readily accessible by a double stroke of a single key (7-7), for fast access. Also it is convenient to find the desired functions when they are grouped according to relevance. Thus, alpha characters are used in connection with the upper keyboard. Fiscal data is grouped under the X key. Trigonometric functions are grouped under keys 2 and 3, and programming functions are found under keys 4 and 5, etc.

In general, with the entry of a problem, the number of keystroke selections is not increased over other keyboards with many more keys. Consider, for example, the multiplication of 12.32 by 6.28. The required successive keystrokes are 1-2-.-3-2-.-6-.-2-8-x, of which the underlined two strokes only are for functional purposes (second decimal for enter operand 12.32 and x for multiply) and the others are data entry strokes. With the conventional operation of RPN (Reverse Polish Notation) the answer automatically appears then on the temporary electronic display screen 21. If there is no decimal point needed in an operand such as 15 then the use of the second decimal point entry mode to save an additional (enter) key requires a double stroke for entry, namely -1-5.-.-, where the second decimal point enters 15 as the operand into a suitable register sometimes termed the "y" register.

As may be seen on the electronic actuable display screen 21 a set of indicia is automatically shown to indicate the special computer conditions, primarily the current mode in which the computer has been placed. Thus, several additional modes of operation may be established supplementing the basic data entry and function selection modes. In addition to the ADD and $/¢ modes already described some of the modes which activate the computer keys for special operation during a sequence of function selection steps thus are briefly described.

To go into the alphanumeric mode, the "alpha" selection is made (XQ-7-8), and the corresponding alpha mode will be displayed on screen 21. In this mode either upper or lower case alpha characters may be selected by further execution of the "shift" function (8-9-In the alpha mode the XQ is not required since the computer already "knows" to expect an alpha selection and only a two keystroke sequence is required.) also shown on the display screen 21 to indicate the alpha case. If the lower case letters are to be locked in, then the "shift lock" function (SHFlok 9, ÷) is selected.

To enter statistical data, the "Stat" mode is selected (XQ, +, 1) and displayed on screen 21. In this and other modes a return to the mode setting function "Stat" will reverse the procedure and exit the previously selected mode. The statistical mode then permits use of arithmetic signs + ($\Sigma+$) and − ($\Sigma-$) for entering data directly into the statistical registers without having to use the XQ key.

In the user mode when selected XQ 4 - 1 the user is permitted to run one of his programs with a single stroke of the key corresponding to the program label. For example, if the user has stored in the computer a program labeled "H" he can enter the user mode by XQ 4 - 1 . In that mode he can repeatedly run program H by a single depression of the X $^{(H)}$ key following a stroke of the XQ key.

In the program mode XQ - 4  5  the SST function (single step through program lines) is accessed simply by stroking 5 - 5 . Upon release of the second stroke one line of the program will have been advanced. If the second stroke of the 5 is held depressed, then after a small time delay, the computer will automatically step through the program one line at a time until the key is released, just like some other computers. Likewise in the program mode the back step BST ( 5  4 ) function will operate in the same manner except that in this case the 4 key is the last controlling key. To exit the program mode 4  5 is executed again. BST (back step), P/R (program run), LBL (label) and other modes as well as the various algebraic sub-programs, etc. usual in computing operations are shown as functions on the corresponding cells for ready recognition and reminder.

It is clear therefore that when this graphic display chart 18′ is afforded that a hand-held computer is more useful without the necessity of frequent reference to an instruction manual and thus can truly be a pocket computer that gives access to hundreds of functions selectable from few computer entry keys.

One particular feature of this invention is the "execute lock" function (XQLOK-XQ, XQ, X) which is used, for example, in the Program mode (and may be automatically engaged in the Program mode) to permit writing programs in successive steps without requiring the XQ keystroke before each selection of a function. This significantly reduces program entry keystrokes, time and the chance for manual entry errors which increases with a larger number of manual manipulations. Similarly the "constant entry" (CONS, XQ , − ) in the program mode permits entry of numerics and the second stroke of the decimal point . signals that the entry is complete and the constant entry mode is automatically exited allowing programming to continue in the Program mode.

This keyboard graphic display 18′ in FIG. 2 has four separate sets of indicia to indicate the entire catalog of functions available. Thus, a primary key function is noted for the single keystroke data entry mode to which the computer returns after switching out of other modes by choice of keyboard functions or automatically after completing a calculation. This mode has as a minimum the decimal digit keys 0–9 and a decimal point key to enter serial digits of a numeric multi-digit word with successive single keystrokes. This is necessary to decrease chances of error, and to avoid unnecessary time consumption in data entry.

A second set of indicia identifies groups of designated functions selectable in the second function entry mode by each first actuated group selection key. These groups are positioned immediately under the corresponding keys for ready recognition and manual execution without a mental and physical jump to another portion of the keyboard than that at which the desired function is visually spotted. This avoids the propensity for error introduced by the search for a function legend ending up at one position on the keyboard and then going to another position to execute a group selection key, as required in the aforementioned patent, for example.

A third set of indicia comprises the selection key notation alongside each function cell. This identifies the second keystroke in the two-stroke selection process for each function that permits the access to as many as $X^2$ functions where X is the total number of keyboard keys. Thus 23 keys could process 529 functions, etc., in utilizing more of the built-in computer chip functions. In this embodiment a fourth indicia set is identified, namely the alpha characters A to R to the left of the keys, which are addressable in the program mode as program labels in the label select mode (LBL, XQ, 4, 7) by a single stroke of the key designating the desired label.

Note that if a conventional arithmetic mode of calculation is used rather than RPN, then the decimal point key can rather be labeled as an = key (equivalent to the execute key to cause the entered function to be executed).

Figure 3:
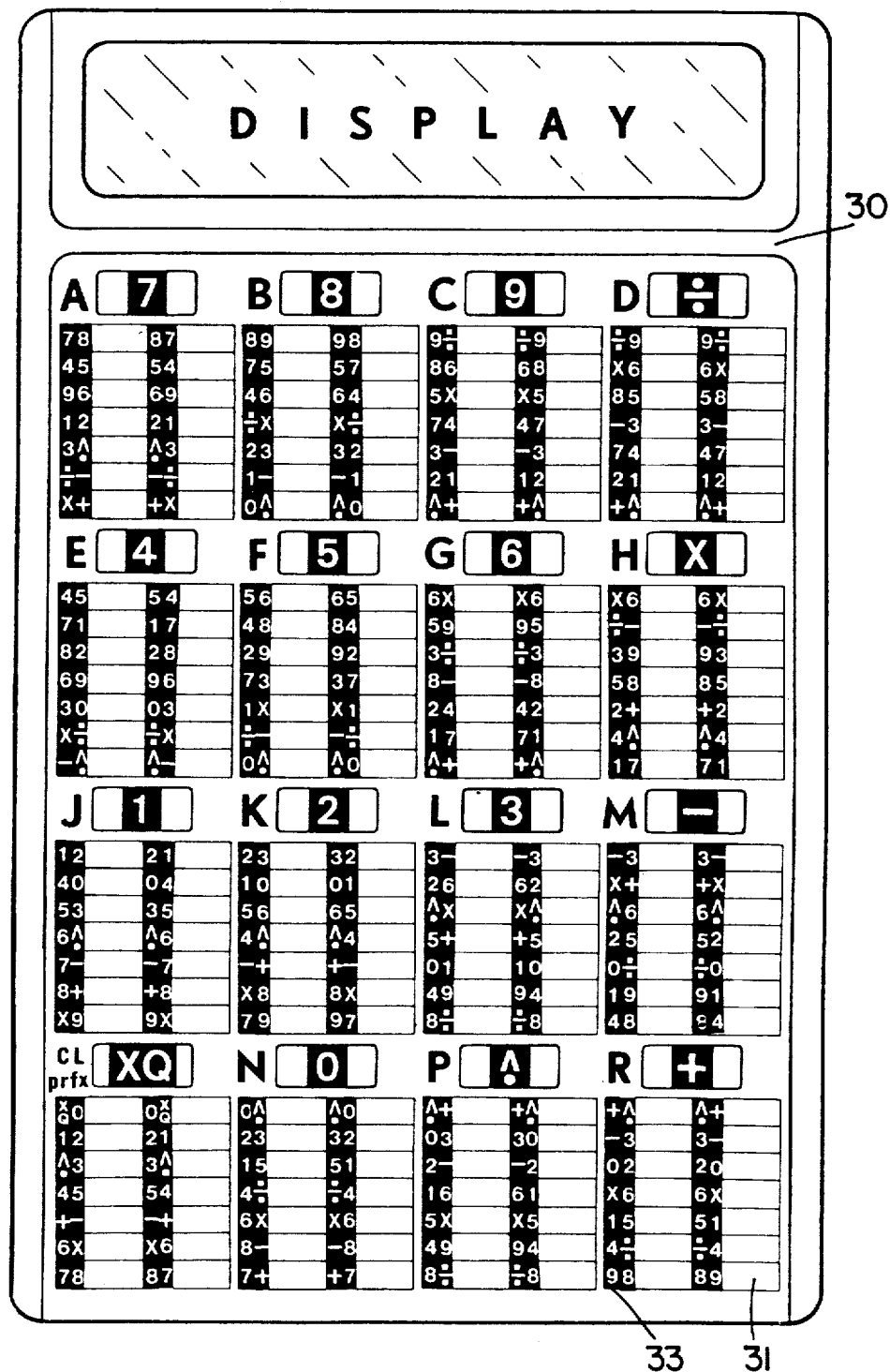

The computer embodiment 30 of FIG. 3 represents a mode of operation that permits a keyboard of X keys to elect up to $X^3$ functions from a computer chip. Thus, with the sixteen key keyboard any one of 4096 functions may be selected. The graphic display chart accommodates only exemplary ones of these functions in 224 available function cells 31. This significant numerical increase of functions selectable per keyboard key is made posssible by converting the function entry mode to a three keystroke sequence.

To illustrate this n=3 keystroke sequence therefore in a format similar to FIG. 2, the FIG. 3 embodiment has in the groupings under the keys a notation indicia 33 column therefore a designation of the next two successive keystrokes (−3, 02, etc.) for access to the correspondingly designated function in the cell block therealongside. This gives the capability to use the computer chip built-in capacity much more completely than keyboards heretofore available in the art. The typical functions more often used can appear in the cells shown on the graphic display chart adjacent the keys, and the remaining functions accessible by the keyboard could be available in accessory overlay charts or index for use when required for special purpose computations. Clearly the keyboard improvements of this invention have expanded the capabilities and usefulness of computers. Whereas this invention is particularly useful in small hand-held computers, it is nonetheless very valuable in the use and programming of desk-top computers, particularly those used by mathematicians and engineers and which in the prior art require commands to be typed in, sometimes using many keystrokes, to address a built-in function. In accordance with this invention, the many typed in keystrokes usually using the "hunt and peck" system are replaced by the stroking two or three of only a few keys, the positions of which are much more easily learned by rote.

It is to be noted that in order to signify the spirit and nature of this invention and the features novel in the art, those routine details well known in the art and the complexities of computer chips making accessible thousands of built-in functions are not necessary in teaching those in the art how to practice the invention, and thus are not set forth herein. Reference of the present state of the art can be made to commercially available computers such as various models made by Hewlett-Packard Company. Specifically reference can be made to the "Hewlett-Packard Model 15C" computer and corresponding instruction manual 00015-90001 entitled "HP-15C Owner's Handbook" printed March 1982 and issued by Hewlett Packard Corvallis Division, 1000 N. E. Circle Blvd., Corvallis, Oreg. 97330, which are incorporated herein by reference to indicate the state of the art and the nature of those techniques routinely adopted by those in the art at the present time. The above mentioned Model HP-15C is only one of many very small and powerful computers on the market today, all of which routinely incorporate so called "computer on a chip". The computer on a chip is often smaller than any one of the multiplicity of keys which are presently required to control its function. In view of this state of the art, where computer logic is routinely performed, keyboard keys are activated to operate in different modes, automatic subroutines are performed for shifting data to various registers, and keys are used for various switching and mode selection functions. The following block logic diagram of FIG. 4 together with the foregoing description will enable those skilled in the art to connect the interface between a keyboard and a modern computer chip for operation as set forth herein in accordance with the present invention.

Figure 4:
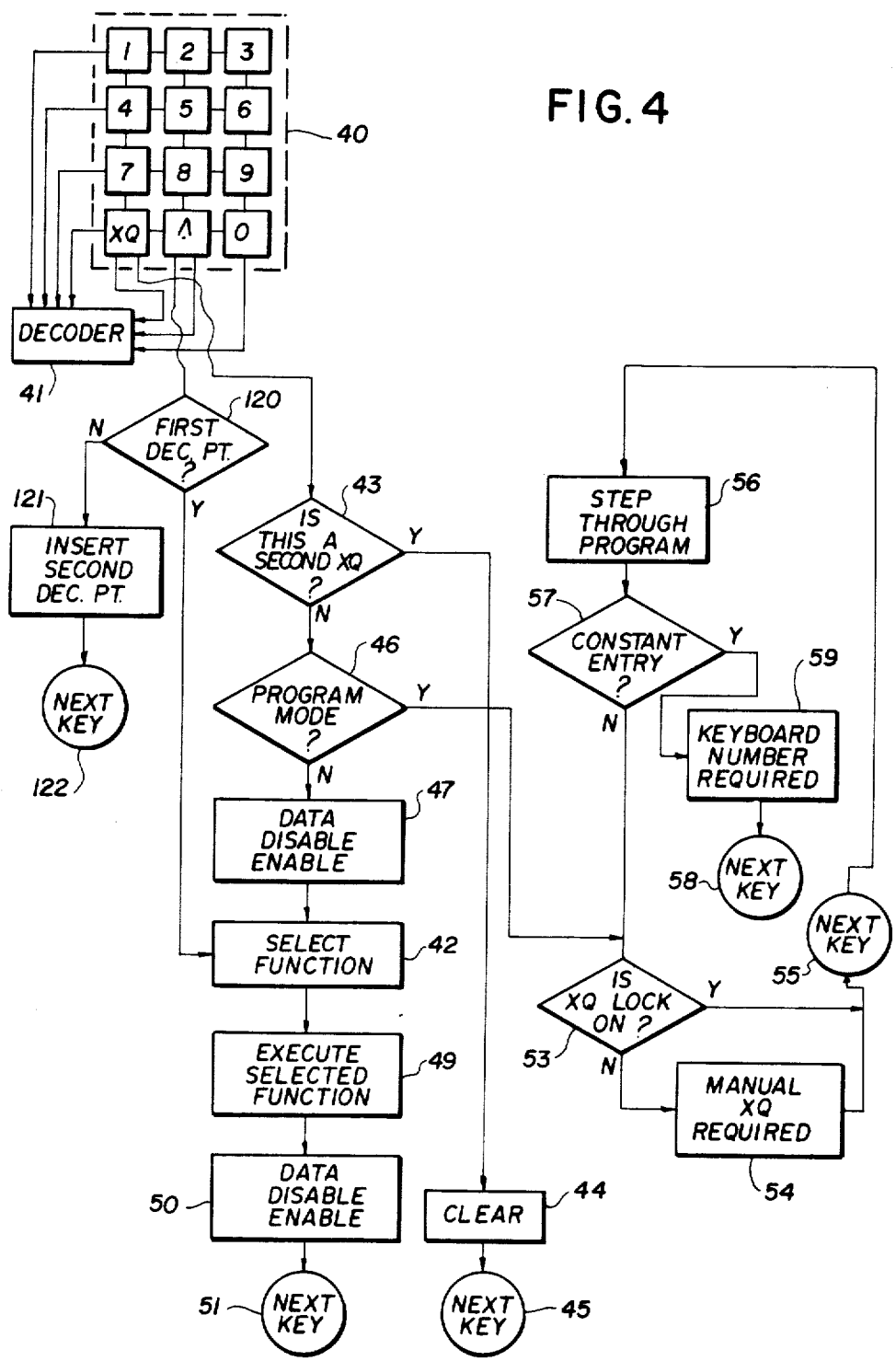
FIG. 4 is a logic flow diagram of the computer to keyboard interface system afforded by this invention.
Figure 5:
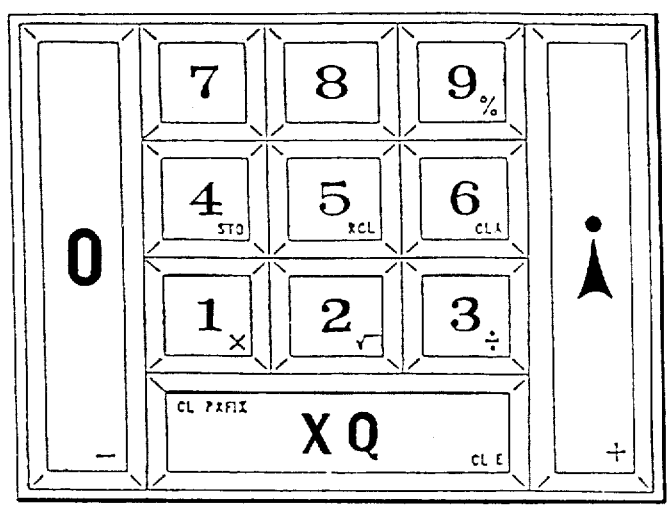
FIG. 5 is a sketch of an alternate arrangement of tweleve keys which may be preferable for some users who are familiar with the touch system, which may be substituted interchangeably with the key arrangement shown in FIG. 1.
Figure 4:
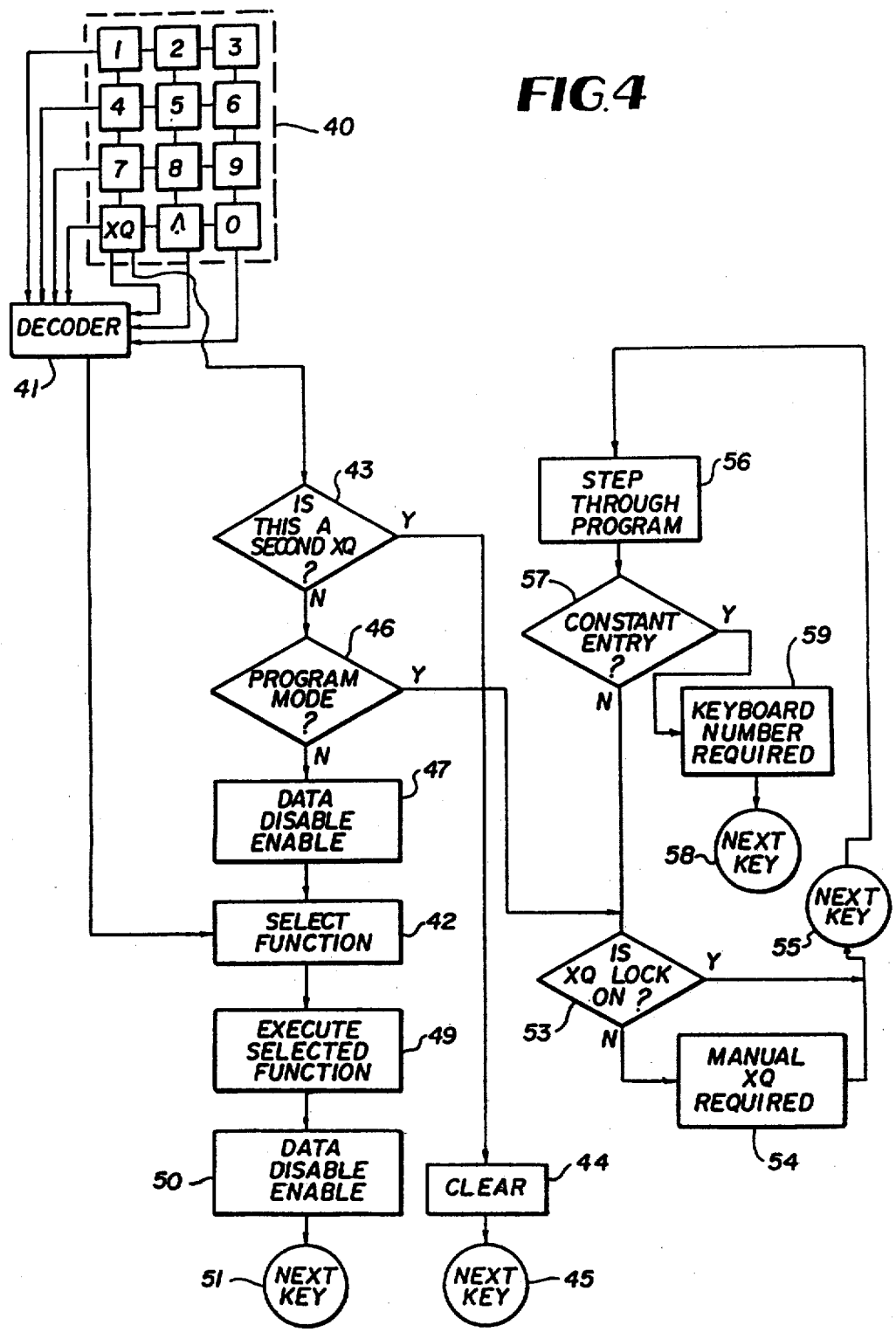

The twelve keys of keyboard 40 of FIG. 4 are set forth to generally indicate that minimal number of keys which can fully operate the computer in the manner hereinbefore described to interface with hundreds or thousands of functions available on a computer chip. As shown by previous examples, more keys can be used advantageously, but in general this invention permits access to more computer functions with fewer keys than the prior art keyboards. Basically the keyboard legend on the individual keys identifies the key data input entry under the live keyboard one-stroke data entry mode.

Decoder 41 converts the keystroke information as required to operate the computer in its various modes of operation. For this invention, the keyboard-to-function select operation interface is of primary importance, and the block 42 signifying that function derives instructions decoded from keyboard 40, when in the execute or select function mode introduced by the execute key XQ.

Further use of the execute key XQ for clearing the register is shown by logic block 43, which clears or voids the appropriate computer register as designated at block 44 if there is a yes decision Y at 43 that the signal comes from a second XQ keystroke. After clearance the computer is activated for next key entry 45.

Also the program mode logic is typical, as illustrated by program mode logic selector 46. This serves when not in the program mode to use the single XQ keystroke to disable the data mode and to enable the function mode at block 47. After a function is selected at 42 from the two (or more) successive keystrokes at line 48, the function is automatically executed at block 49. Thereafter automatically the data input mode is restored at 50 for the next key operation 51.

In the program mode (line 52), inquiry is made at 53 whether the XQLock mode is in effect, and if not a manual XQ keystroke is required 54 to operate the next key 55 for stepping the program at block 56. Alternately it may be desirable to have the XQ lock on whenever the computer is in the program mode. This choice is preferably made when the specific purpose of the computer has been decided upon. When the constant entry mode is sensed at logic choice box 57, then a numeric word is required to be manually entered at box 59 which when completed enables the computer operation to continue with the next key 58.

In this typical manner the aforesaid computer operatin is diagrammed and put into effect by those skilled in the art.

Having therefore improved the state of the art, those features of novelty believed descriptive of the spirit and nature of the invention are defined with particularity in the claims.

I claim:

1. A computer keyboard system for a computer operable to execute a large number of functions in response to keyboard selection of the various accessible functions, comprising in combination, a set of keyboard keys numbering X including ten digit keys 0 to 9, means for operating the keyboard in a first numerical computer mode of operation activating the keys for executing a corresponding set of designated functions with a single keystroke including the activation of the digit keys for sequentially entering decimal digits on successive single keystrokes to form multi-digit numerical words, and means including in said set of keys a further execute key with corresponding operation means for shifting the mode of action from the first operation mode to a second multi-function computer mode requiring a plurality n of sequential non-simultaneous keystrokes of any selected ones of said X keys for execution of a further set of designated functions, whereby the keyboard has the capability of processing $X^n + X$ designated functions.

2. A keyboard system as defined in claim 1 wherein n is two and X is no greater than fifteen thereby giving the keyboard the capacity to process up to 240 designated functions.

3. A keyboard system as defined in claim 1 wherein the keyboard keys are accompanied by a visible graphic display chart identifying the sequential keys to be stroked for selecting specific functions in said further set of designated functions in the second computer mode by indicia located in a position alongside the keys visible when the keys are being operated.

4. A keyboard system as defined in claim 3 wherein the keyboard keys are separated from one another by a space, and wherein a set of functions using a particular key as the first keystroke of said sequential keystrokes is charted in the space adjacent that key and identifies the subsequent keystroke selection for activating the functions.

5. The computer keyboard system defined in claim 3 further comprising, a first set of indicia identifying the primary function of each of the keys of said set in said first computer mode, said chart comprising second sets of indicia identifying groups of said designated functions selectable by a first keystroke of individual ones of the keys in the second said computer mode, and said chart further comprising a third set of indicia identifying for each said designated function in said further set one following sequential keystroke sequence selection to be made for activating that particular function.

6. A computer keyboard system as defined in claim 5 wherein n is three and the third set of indicia identifies a sequence of two of said following sequential keystroke selections.

7. The computer keyboard system defined in claim 3 wherein the set of designated functions includes a function for establishing a programming mode.

8. The computer keyboard system defined in claim 7 wherein the set of designated functions further includes a constant entry mode for operation in the programming mode to actuate said numerical digit keys.

9. The computer keyboard system defined in claim 7 wherein the set of designated functions includes a function locking the computer in the second computer mode to permit the entry of a sequence of program steps without repeating the stroking of the execute key for each program step.

10. The computer keyboard system defined in claim 7 wherein the set of designated functions includes a program stepping function for enabling the automatic step by step sequencing of the program when the program mode is in effect.

11. The computer keyboard system defined in claim 3 wherein the set of designated functions includes a function for establishing an alphanumeric mode for entry of alphabetic characters by the keys in said set.

12. The computer keyboard system of claim 11 including further designated functions in said set operable in the alphanumeric mode to enter symbols.

13. The computer keyboard system defined in claim 3 wherein the set of designated functions includes a function for establishing a statistical mode in which arithmetic symbols are entered as statistical inputs without performing an arithmetic function.

14. The keyboard system defined in claim 3 wherein said chart identifies groups of functions selected by a first keystroke from a designated one of the keys, wherein the groups of functions selected by the first keystroke include a set of related functions in one of the groups including alphabetic characters, trigonometric functions, programming functions and fiscal functions.

15. The keyboard system defined in claim 3 wherein the chart identifies groups of functions selected by a first keystroke from a designated one of the keys wherein the function designated for a second sequential stroke of that same key is a frequently used function taken from one of the groups including vowels, basic program functions, and basic arithmetic functions.

16. The computer keyboard defined in claim 1 wherein said set of keys includes four arithmetic function keys operable with a single keystroke in said first computer mode to functionally direct the computer to perform the respective arithmetic functions.

17. A computer keyboard system as defined in claim 1 consisting of only twelve keys in said set including an additional decimal point key operable on its second stroke within a numerical word as a computer instruction command.

18. A computer keyboard system as defined in claim 1 having a temporary electronic display panel with indicia thereon selectable automatically by the computer to indicate the mode of operation of the computer.

19. The computer keyboard defined in claim 1 for a portable hand-carried computer wherein set of keys has no more than sixteen keys arranged in a pattern spacing individual keys far enough apart to operate single keys with a human finger without danger of interference with other keys.

20. The computer keyboard of claim 1 with a key selection sequence for putting the computer into an ADD mode wherein a plurality of keys are operable to perform a plurality of arithmetic functions including +, −, with selection of a single function while eliminating the necessity to stroke the execute key between the plurality of entries.

21. The keyboard of claim 20 including indicia on the keys identifying their use in selecting the arithmetic functions operable in the ADD mode.

22. The computer keyboard of claim 1 with a key selectin sequence for putting the computer into an automatic decimal point entry mode ($/¢) wherein the decimal point key need not be stroked for entry of numbers, and wherein the decimal point key is used in this mode for performing a separate function otherwise necessitating a further key.

* * * * *

UNITED STATES PATENT AND TRADEMARK OFFICE
CERTIFICATE OF CORRECTION

PATENT NO. : 4,547,860

DATED : October 15, 1985

INVENTOR(S) : James M. Lapeyre

It is certified that error appears in the above-identified patent and that said Letters Patent is hereby corrected as shown below:

Figure 4 should be deleted to be replaced with figure 4 as shown on the attached sheet.

Signed and Sealed this

Twenty-seventh Day of May 1986

[SEAL]

Attest:

DONALD J. QUIGG

Attesting Officer

Commissioner of Patents and Trademarks

REEXAMINATION CERTIFICATE (4206th)

United States Patent [19]
Lapeyre

[11] B1 4,547,860
[45] Certificate Issued Nov. 21, 2000

[54] COMPUTER KEYBOARDS WITH FEW KEYS DESIGNATING HUNDREDS OF FUNCTIONS

[75] Inventor: James M. Lapeyre, New Orleans, La.

[73] Assignee: The Laitram Corporation, New Orleans, La.

Reexamination Request:
No. 90/003,101, Jun. 23, 1993

Reexamination Certificate for:
Patent No.: 4,547,860
Issued: Oct. 15, 1985
Appl. No.: 06/459,998
Filed: Jan. 21, 1983

Certificate of Correction issued May 27, 1986.

[51] Int. Cl.[7] ........................................... G06F 3/02
[52] U.S. Cl. ............................. 708/146; 708/145
[58] Field of Search ................. 364/709.15, 709.16, 364/710.09, 706, 744, 709.12; 708/142, 145, 146, 169, 130, 542

[56] References Cited

U.S. PATENT DOCUMENTS

| | | | |
|---|---|---|---|
| 3,675,513 | 7/1972 | Flanagan | 179/84 VF |
| 3,762,637 | 10/1973 | Hernandez | 364/709.15 |
| 3,996,562 | 12/1976 | Reach et al. | 364/706 |
| 4,156,921 | 5/1979 | Wenninger et al. | 364/744 |
| 4,177,520 | 12/1979 | Meff | 364/710.09 |
| 4,208,720 | 6/1980 | Harrison | 364/709.16 |
| 4,385,291 | 5/1983 | Piguet | 340/712 |
| 4,718,029 | 1/1988 | Morino et al. | 364/709.16 |

OTHER PUBLICATIONS

D.B. Smith and F.H. Westervelt, "The Standard Pushbutton Telephone As An Interactive General Computer Terminal", IEEE Convention Digest, Mar. 1970.

"65 Notes" (vol. 2, No. 3), Mar. 1975.

"65 Notes" (vol. 3, No. 9), Oct.–Nov. 1976.

HP–65 Owner's Handbook, Jul. 1974.

Claver et al., "Computer–Assisted Word Entry Process" *IBM Technical Disclosure Bulletin* vol. 21, No. 10 Mar. 1979 p. 4184.

*Primary Examiner*—David H. Malzahn

[57] ABSTRACT

A computer keyboard system provides for fast entry of all numeric data, yet with only a small number of keys, such as the minimum number of twelve, is able to make hundreds of computer functions available for access from the keyboard. Typically a sixteen key keyboard will make available 266 different functions from a modern computer chip, surprisingly without sacrifice of more complex programming procedures and with significant advantage in providing finger room for error free operation of pocket-size computers, for example. A charted catalog of functions and corresponding keystroke selections is graphically displayed adjacent the keyboard keys so that reference to an instruction manual is minimized. Also by appropriate abbreviated notation a more diverse selection of functions is available to the keyboard as designated functions. This simplification of keyboards to be able to provide access to the many built-in programs, subroutines and functions available on modern day computer chips is made feasible by operating a live keybaord in a data input mode and shifting the mode by an execute key to a function selection mode requiring a sequence of two (or more) keystrokes. Thereby for X keys on a keyboard $X^n$ functions become accessible where n is the number of keystrokes in the function selection sequence.

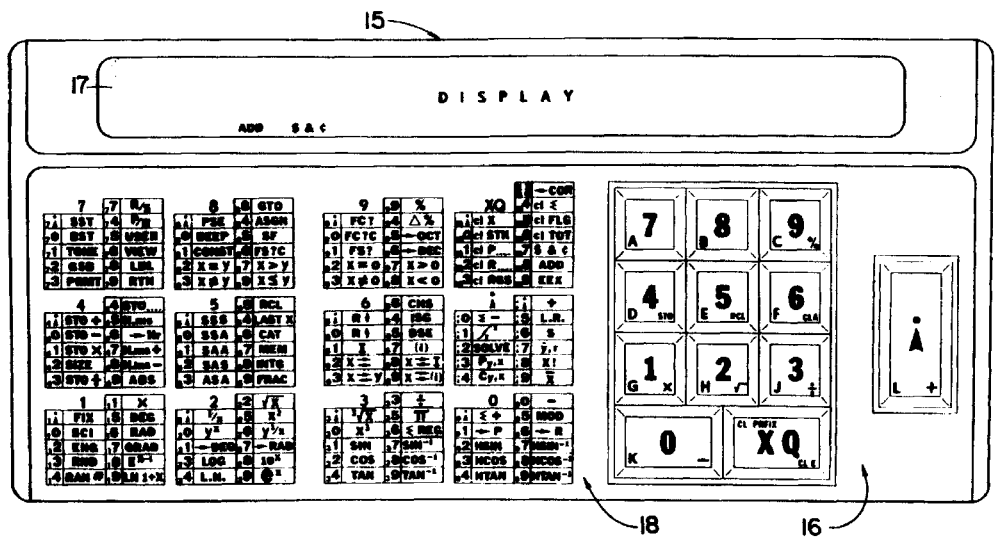

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3–15 and 17 are cancelled.

Claims 2, 16, 18–20 and 22 are determined to be patentable as amended.

Claim 21, dependent on an amended claim, is determined to be patentable.

2. A keyboard system as defined in claim [1] *16* wherein n is two and X is no greater than fifteen thereby giving the keyboard the capacity to process up to 240 designated functions.

16. [The computer keyboard defined in claim 1] *A computer keyboard system in a hand held computer operable to execute a large number of functions in response to keyboard selection of the various accessible functions, comprising in combination, a set of keyboard keys numbering X including ten digit keys 0 to 9, means for operating the keyboard in a first numerical computer mode of operation activating the keys for executing a corresponding set of designated functions with a single keystroke without the need for activating additional keys including the activation of the digit keys for sequentially entering decimal digits on successive single keystrokes to form multi-digit numerical words, and means including in said set of keys a further execute key with corresponding operation means for shifting the mode of action from the first operation mode to a second multi-function computer mode requiring a plurality n of sequential non-simultaneous keystrokes of any selected ones of said X keys for execution of a further set of designated functions, whereby the keyboard has the capability of processing $X^n + X$ designated functions and wherein said set of keys includes* four arithmetic function keys operable with a single keystroke in said first computer mode to functionally direct the computer to perform the respective arithmetic functions.

18. A computer keyboard system as defined in claim [1] *16* having a temporary electronic display panel with indicia thereon selectable automatically by the computer to indicate the mode of operation of the computer.

19. The computer keyboard defined in claim [1] *16* for a portable hand-carried computer wherein *said* set of keys has no more than sixteen keys arranged in a pattern spacing individual keys far enough apart to operate single keys with a human finger without danger of interference with other keys.

20. [The computer keyboard of claim 1 with] *A computer keyboard system in a hand held computer operable to execute a large number of functions in response to keyboard selection of the various accessible functions, comprising in combination, a set of keyboard keys numbering X including ten digit keys 0 to 9, means for operating the keyboard in a first numerical computer mode of operation activating the keys for executing a corresponding set of designated functions with a single keystroke without the need for activating additional keys including the activation of the digit keys for sequentially entering decimal digits on successive single keystrokes to form multi-digit numerical words, and means including in said set of keys a further execute key with corresponding operation means for shifting the mode of action from the first operation mode to a second multi-function computer mode requiring a plurality n of sequential non-simultaneous keystrokes of any selected ones of said X keys for execution of a further set of designated functions, whereby the keyboard has the capability of processing $X^n + X$ designated functions and said system includes* a key selection sequence for putting the computer into an ADD mode wherein a plurality of keys are operable to perform a plurality of arithmetic functions including +, −, with selection of a single function while eliminating the necessity to stroke the execute key between the plurality of entries.

22. The computer keyboard of claim [1] *16* with a key selectin sequence for putting the computer into an automatic decimal point entry mode ($/¢) wherein the decimal point key need not be stroked for entry of numbers, and wherein the decimal point key is used in this mode for performing a separate function otherwise necessitating a further key.

* * * * *